(12) United States Patent
Zhu

(10) Patent No.: US 9,988,106 B2
(45) Date of Patent: Jun. 5, 2018

(54) SUSPENSION AUTOMOBILE

(71) Applicant: Xiaoyi Zhu, Guangdong (CN)

(72) Inventor: Xiaoyi Zhu, Guangdong (CN)

( * ) Notice: Subject to any disclaimer, the term of this patent is extended or adjusted under 35 U.S.C. 154(b) by 0 days. days.

(21) Appl. No.: 15/414,984

(22) Filed: Jan. 25, 2017

(65) Prior Publication Data

US 2017/0129551 A1     May 11, 2017

Related U.S. Application Data

(63) Continuation-in-part of application No. PCT/CN2015/097007, filed on Dec. 10, 2015.

(30) Foreign Application Priority Data

| | | |
|---|---|---|
| Nov. 6, 2015 | (CN) | 2015 1 0769580 |
| Nov. 6, 2015 | (CN) | 2015 1 0769609 |
| Nov. 6, 2015 | (CN) | 2015 1 0769627 |
| Nov. 6, 2015 | (CN) | 2015 1 0769921 |

(51) Int. Cl.

| | |
|---|---|
| *B62D 35/02* | (2006.01) |
| *B62D 35/00* | (2006.01) |
| *B60L 8/00* | (2006.01) |
| *B60L 11/18* | (2006.01) |
| *B60K 3/00* | (2006.01) |

(52) U.S. Cl.
CPC .............. *B62D 35/001* (2013.01); *B60K 3/00* (2013.01); *B60L 8/003* (2013.01); *B60L 11/18* (2013.01); *B62D 35/02* (2013.01); *B60Y 2200/11* (2013.01); *B60Y 2200/148* (2013.01); *B60Y 2200/91* (2013.01); *B60Y 2304/00* (2013.01); *B60Y 2400/40* (2013.01)

(58) Field of Classification Search
CPC .... B62D 35/001; B62D 35/02; B62D 35/002; B60K 3/00; B60L 8/003; B60L 11/18; B60Y 2200/11; B60Y 2200/148; B60Y 2200/91; B60Y 2304/00; B60Y 2400/40
USPC ........ 180/2.1, 2.2, 7.1, 903; 296/180.1, 208, 296/181.5
See application file for complete search history.

(56) References Cited

U.S. PATENT DOCUMENTS 4,343,506 A * 8/1982 Saltzman ............. B62D 35/001
                                                            105/1.2
4,789,117 A * 12/1988 Paterson ............... B62D 35/00
                                                            138/37

(Continued)

*Primary Examiner* — John D Walters
(74) *Attorney, Agent, or Firm* — Stein IP, LLC

(57) ABSTRACT

A suspension automobile comprising an automobile body, wheels and a flow disturbing plate, the wheels connect the flow disturbing plate through connecting devices, and a fluid channel communicating with the outside is formed between the upper surface of the flow disturbing plate and a bottom shell of the automobile body; a power device used for driving the automobile is contained in the body and is suspended along with lift force generated by the body. The invention changes the common sense that the wheels bear all weight generated by the self-weight, loads, and gravitational acceleration of the automobiles when traveling; the body which exceeds 90% by weight of the automobile generates lift force to suspend, the wheels eliminate lift force; meanwhile, a novel propelling force source is found from fluid resistance; the suspension automobile can be driven by various energy including engines and clean energy, thus effectively reduce energy loss.

21 Claims, 8 Drawing Sheets

(56) References Cited

U.S. PATENT DOCUMENTS

| | | | | |
|---|---|---|---|---|
| 5,114,099 A * | 5/1992 | Gao | ................. | B64C 21/10 |
| | | | | 244/130 |
| 6,685,256 B1 * | 2/2004 | Shermer | ................. | B60J 5/108 |
| | | | | 296/180.1 |
| 8,315,847 B1 * | 11/2012 | Schmidt | ................. | B64C 21/10 |
| | | | | 244/130 |
| 8,684,446 B2 * | 4/2014 | Zhu | ................. | B61D 17/02 |
| | | | | 296/180.1 |
| 9,278,719 B2 * | 3/2016 | Zhu | ................. | B62D 35/02 |
| 2002/0000497 A1 * | 1/2002 | Drews | ................. | B32B 38/00 |
| | | | | 244/200 |

\* cited by examiner

SUSPENSION AUTOMOBILE

CROSS-REFERENCE TO RELATED APPLICATIONS

This application is a continuation-in-part of International Application No.: PCT/CN2015/097007, filed Dec. 10, 2015, which claims the benefit of priority to Chinese Application No.: 201510769627.8, Chinese Application No.: 201510769921.9, Chinese Application No.: 201510769580.5, and Chinese Application No.: 201510769609.X, all filed Nov. 6, 2015, in the State Intellectual Property Office, the disclosures of which are incorporated in their entireties herein by reference.

TECHNICAL FIELD

The invention relates to the field of automobiles, in particular to an energy-saving automobile which travels in a suspension mode in the natural state.

DESCRIPTION OF RELATED ART

In the one hundred plus years since the appearance of automobiles, the basic structure and principle of automobiles have not substantially changed; according to the general common sense in the field: when the automobile travels, the wheels inevitably bear all the weight of the automobile, power is consumed according to the weight, and consequentially large power consumption is caused.

Furthermore, a weight increasing method is generally adopted by the existing automobiles to overcome the lift force, the self weight of the automobiles is increased by multiple times, and consequentially, energy consumption is increased by multiple times.

The most serious and biggest problem, not solved in the one hundred years, regarding the development of automobiles is that at least about 85% of the energy is consumed for overcoming fluid resistance when the automobiles travel at a high speed, the actual energy utilization rate is less than about 15%, and the development of automobiles has been seriously affected by such low energy utilization rate.

Meanwhile, automobiles driven by electric energy have quite a short range of travel mileage, thereby being extremely difficult to use and popularize widely; automobiles which are driven by green energy such as solar energy or compressed gas still remain in the concept phase, thereby being more difficult to implement in the true sense.

A suspension automobile is disclosed in the authorized United State invention patent, with the patent number being U.S. Pat. No. 9,278,719 B2, by the inventor, wherein a fluid channel is formed in the lower portion of the automobile through the connection of connecting devices and a flow disturbing plate, and the flow disturbing plate is further connected with wheels, so that lift force is generated by an automobile body and eliminated by the wheels. Although the structure is simple and convenient to implement, the flow disturbing plate in the structure is equivalent to the chassis of a traditional automobile and has to bear all the weight of the automobile body, the weight of the chassis of the traditional automobile accounts for about a quarter to one third of the total weight of the automobile body, and the automobile body generates lift force while the flow disturbing plate cannot generate lift force when the automobile travels; for this reason, the flow disturbing plate equivalent to the chassis of the traditional automobile needs to be prevented from bearing the weight of the automobile body firstly for saving a greater amount of energy.

For solving the problems, the inventor provides a suspension automobile which can well solve the problems through further research and experiments.

BRIEF SUMMARY OF THE INVENTION

According to the invention, flow disturbing surfaces for lengthening fluid passing paths are locally or integrally arranged on the upper portion of an automobile body and/or the lower surface of a flow disturbing plate, so that lift force is generated by the automobile body and eliminated by the wheels. A suspension automobile of the invention does not have to travel in a suspension mode by a certain distance, instead, the distribution state of downward pressure generated by the weight of a traditional automobile due to the earth's gravity is changed, downward gravity generated by the self weight of the automobile body can be definitely reduced through upward lift force, and accordingly the weight of the automobile in the traveling process is reduced. Energy is consumed according to the weight, energy consumption of the automobile in the traveling process is reduced since the weight is reduced, and the larger the difference between the path of fluid passing through the upper portion of the automobile body of the automobile and the path of the fluid passing through the lower portion of the automobile body of the automobile is, the higher the speed of the automobile is, the greater the generated lift force is, the more downward gravity is overcome, and the more energy is saved.

The invention aims to achieve the technical purposes that:

The general common sense that all weight generated by the self weight, loads and the gravitational acceleration of an automobile in the traveling process are borne by wheels is changed; the general common sense that fluid resistance is guided to a traditional automobile is also changed, so that a novel propelling force source is obtained by reducing the fluid resistance; a suspension automobile suitable for being driven by various kinds of clean energy such as engines, electric energy, solar energy and compressed gas is provided.

According to the technical scheme adopted by the invention for achieving the technical purposes:

Provided is a suspension automobile, and the suspension automobile comprises an automobile body and wheels, and is characterized by further comprising a flow disturbing plate connected with the automobile body; the flow disturbing plate is connected with the wheels through connecting devices, and a fluid channel with the front portion and rear portion communicating with the outside is formed between the upper surface of the flow disturbing plate and the lower portion of the automobile body; flow disturbing surfaces for lengthening fluid passing paths are arranged on the upper portion of the automobile body and/or the lower surface of the flow disturbing plate, so that lift force is generated by the automobile body and eliminated by the wheels; a power device used for driving the automobile is contained in the automobile body, and the power device comprises an engine or an electric device or a solar device or a compressed gas device, and is suspended along with the lift force generated by the automobile body.

The invention has the beneficial effects that the fluid channel with the front portion and the rear portion communicating with the outside is formed between the flow disturbing plate connected with the wheels and the bottom of the automobile body, so that the flow speed of fluid passing through the bottom of the automobile body is made lower than the flow speed of the fluid passing through the upper portion of the automobile body, a great pressure difference is generated between the upper portion and the lower portion of the automobile body accordingly to make the automobile body generate lift force, and the automobile body can be better suspended; meanwhile, the flow speed of the outer surface of the flow disturbing plate is higher than the flow speed of the inner surface of the flow disturbing plate, so that lift force is eliminated by the wheels; the automobile body serving as a load space is made to be suspended through the lift force, and the weight is reduced and energy is saved in the traveling process of the automobile. Furthermore, the heavy power device of the suspension automobile of the invention is contained in the automobile body and is suspended along with the lift force generated by the automobile body, and an automobile driven by clean energy can be easily obtained since the heavy power device of an automobile driven by clean energy such as electric energy, solar energy and compressed gas is suspended along with the automobile body.

A second suspension automobile is further provided based on the same concept:

A suspension automobile comprises an automobile body and wheels, and is characterized in that an inner fluid channel and an outer fluid channel which communicate with the outside are formed in a shell surrounding the automobile body, and a flow disturbing surface used for lengthening a fluid passing path is arranged in the outer fluid channel, so that the flow speed in the outer fluid channel is made higher than the flow speed in the inner fluid channel, and accordingly a pressure difference is generated for reducing fluid resistance; the suspension automobile further comprises a flow disturbing plate, wherein the flow disturbing plate connected with the automobile body is connected with the wheels through connecting devices, a fluid channel communicating with the outside is formed between the upper surface of the flow disturbing plate and the lower portion of the automobile body, and flow disturbing surfaces are arranged on the upper portion of the automobile body and/or the lower surface of the flow disturbing plate, so that lift force is generated by the automobile body and eliminated by the wheels.

The invention has the beneficial effects that the inner fluid channel and the outer fluid channel are sequentially arranged in the automobile body of the automobile, and the flow disturbing surface is arranged in the outer fluid channel, so that the flow speed of fluid passing through the outer fluid channel is made higher than the flow speed of fluid passing through the inner fluid channel, and the pressure difference is generated due to the different flow speeds between the inner flow channel and the outer fluid channel; the larger the difference between the flow speeds in the inner fluid channel and the outer fluid channel is, the more the fluid resistance transferred to the outside is, and fluid resistance generated in the traveling process of the automobile can be effectively reduced; the larger the difference between the flow speeds of the inner fluid channel and the outer fluid channel is, the more counteracted the outside fluid pressure in the opposite direction is, the more the reduced fluid resistance is, and accordingly more power sources can be obtained by reducing the fluid resistance.

A third suspension automobile is further provided based on the same concept:

The suspension automobile is characterized in that the suspension automobile comprises an automobile and a combined plate, wherein the combined plate is formed by connecting an upper plate and a lower plate through two or more supporting frames, fluid channels communicating with the outside are formed between the upper surface of the automobile and the upper plate as well as between the lower surface of the automobile and the lower plate correspondingly, the lower plate is connected with wheels through connecting devices, and flow disturbing surfaces for lengthening fluid passing paths are arranged on the upper surface of the automobile and/or the lower surface of the lower plate, so that lift force is generated by the automobile and eliminated by the wheels.

The invention has the beneficial effects that the combined plate is integrally formed by connecting the upper plate and the lower plate through the two or more supporting frames, the automobile is arranged between the upper plate and the lower plate, and the upper fluid channel and the lower fluid channel which communicate with the outside are formed between the upper surface of the automobile and the upper plate as well as between the lower surface of the automobile and the lower plate correspondingly; the lower plate is connected with the wheels through the connecting devices, and the flow disturbing surface which is concave and convex relative to the surface is arranged on the lower surface of the lower plate, so that lift force is generated by the automobile and eliminated by the wheels.

DESCRIPTION OF THE MARKS

Automobile body—1; shell—101; automobile—11; combined plate—12; upper surface—13; lower surface—14; upper plate—15; lower plate—16; supporting frame—17; wing—18; lower shell—2; fluid channel—3; first fluid channel—31; second fluid channel—32; flow disturbing plate—4; flow disturbing surface—41; supporting plate—5; magnetic device—6; power device—7; upper shell—8; inner fluid channel—21; outer fluid channel—22; first air port—23; second air port—24; exhaust port—25; connecting device—27; wheel—28; connecting shaft—29; air inlet—30; communication pipe—301; solar device—302; elastic device—303.

DETAILED DESCRIPTION OF THE INVENTION

A detailed description of the technical content, structural features, purposes and effects of the invention are given with execution modes and accompanying drawings as follows:

The key concept of the invention lies in that by means of the different flow speeds of a fluid passing through different positions of an automobile body, pressure differences and lift force are generated by the automobile body, and accordingly the weight of the automobile body is reduced, and energy is saved; meanwhile, pressure differences are generated by wheels to eliminate the lift force, so that the road holding capacity of the wheels is improved, and traveling safety is guaranteed.

Figure 1:
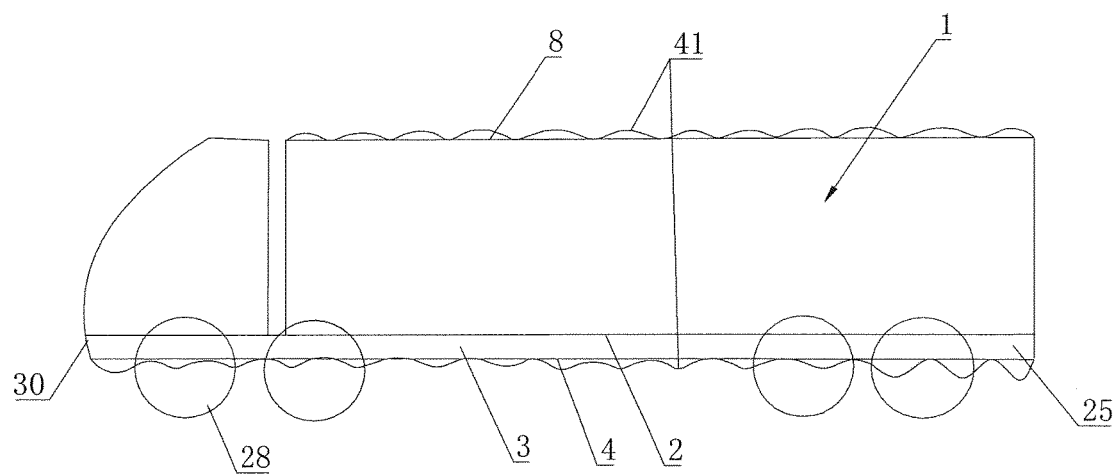
FIG. 1 is a structure schematic diagram of the invention.
Figure 2:
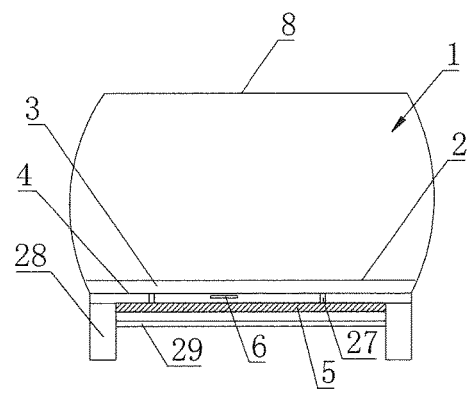
FIG. 2 is a rear-view structure schematic diagram of the invention.
Figure 3:
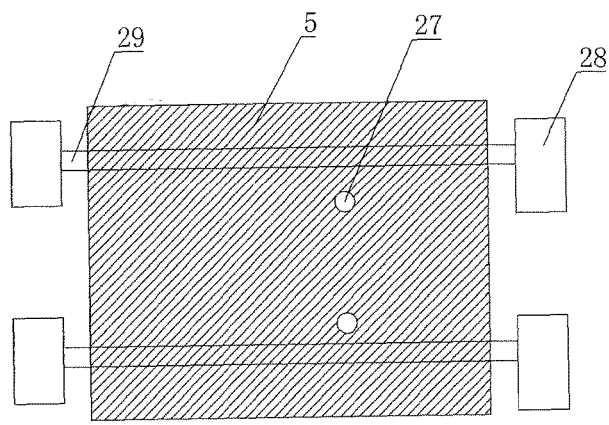
FIG. 3 is a structure schematic diagram of a supporting plate of the invention.

The first embodiment: as is shown in FIGS. 1-3, a truck comprises a flow disturbing plate connected with an automobile body, and the flow disturbing plate 4 is arranged at a position a certain distance away from a lower shell 2 of the automobile body 1, so that a fluid channel 3 with the front portion and the rear portion communicating with the outside is formed; the front portion and the rear portion of the fluid channel communicate with the outside through an air inlet 30 formed in the front portion of the automobile body 1 and an exhaust port 25 formed in the rear portion of the automobile body 1 correspondingly.

A supporting plate is arranged on connecting shafts 29 (hard axles) between one or two sets of left and right wheels 28, and the areas, corresponding to the one or two sets of wheels, of the supporting plate 5 are connected with the connecting shafts 29; the supporting plate and the flow disturbing plate 4 are connected through connecting devices 27, and the flow disturbing plate 4 is connected with the lower shell 2 of the automobile body 1, so that the fluid channel 3 is formed.

A flow disturbing surface 41 is arranged in an upper shell 8 of the automobile body 1, so that the path of fluid passing through the upper shell 8 of the automobile body 1 is made longer than the path in the lower shell 2 of the automobile body 1 and the path in the fluid channel 3, and accordingly an upward pressure difference is generated to make the automobile body 1 generate lift force; a flow disturbing surface 41 is arranged on the lower surface of the flow disturbing plate 4, so that the path of the fluid passing through the lower surface of the flow disturbing plate 4 is made longer than the paths of the fluid passing through the upper surface of the flow disturbing plate 4 and the fluid channel 3, and accordingly a downward pressure is generated and directly acts on the wheels 28 to reduce or eliminate lift force.

Preferably, the connecting devices 27 are elastic or hydraulic or pneumatic non-rigid flexible structures, and thus the wheels are prevented from being driven to generate lift force when the automobile body generates lift force.

Furthermore, flow disturbing surfaces 41 are arranged on the lower surfaces, namely the surfaces facing the pavement, of the flow disturbing plate 4 and the supporting plate 5 correspondingly, so that the path of fluid passing through the lower surface of the flow disturbing plate 4 is made longer than the paths of the fluid passing through the upper surface, which is a plane, of the flow disturbing plate 4 and the fluid channel 3 to generate a downward pressure, and the path of the fluid passing through the lower surface of the supporting plate 5 is made longer than the paths of the fluid passing through the upper surface, which is a plane, of the supporting plate 5 and the fluid channel 3 to generate a downward pressure; the downward pressures are generated by the flow disturbing plate 4 and the supporting plate 5 correspondingly, and the two pressures are superposed and directly act on the wheels 28 through the connecting shaft 29, so that lift force of the wheels 28 is better reduced or eliminated, and the road holding capacity and safety performance of the wheels are improved.

The flow disturbing surfaces 41 can lengthen the fluid passing paths and are one kind or the combination of arc flow disturbing strips, triangular flow disturbing strips, trapezoidal flow disturbing strips and spiral flow disturbing strips which are concave or convex relative to the surfaces; the flow disturbing surfaces 41 can also be ripple surfaces symmetrically formed in the longitudinal direction or symmetrically or asymmetrically formed in the longitudinal and transverse directions, so that the paths of the fluid passing through the outer surface of the flow disturbing plate 4 and the outer surface of the upper shell 8 are further lengthened.

Figure 14:
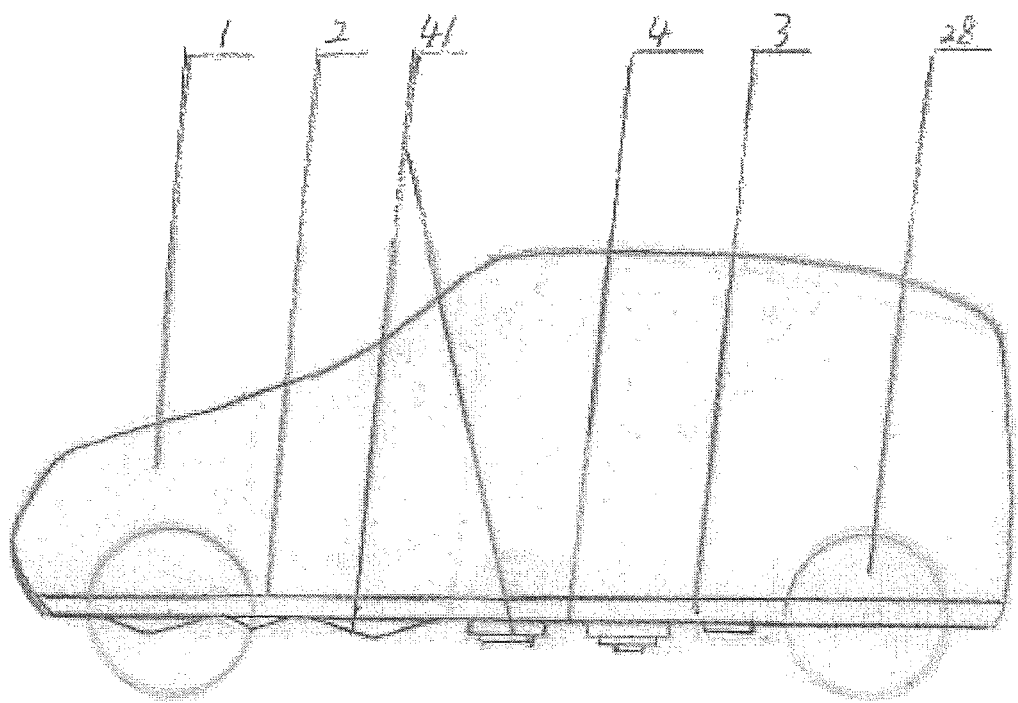
FIG. 14 is a structure schematic diagram of the invention.

FIG. 14 shows a plurality of triangular and trapezoidal flow disturbing strips with different sizes which are concave or protrude from the outer surface of the flow disturbing plate 4, these triangular or trapezoidal flow disturbing strips form asymmetrical flow disturbing surface 41. The triangular flow disturbing strips on the left of the figure constitute asymmetrical triangular flow disturbing surface 41, and the trapezoidal flow disturbing strips on the right of the figure form asymmetrical trapezoidal flow disturbing surface 41.

Please see FIG. 2, the supporting plate 5 is connected with the flow disturbing plate 4 through the multiple connecting devices 27, and the flow disturbing plate 4 is further connected with the automobile body 1, wherein the connecting devices 27 and magnetic devices 6 with opposite polarities are arranged in the channel formed between the lower surface of the flow disturbing plate 4 and the supporting plate 5, and the magnetic devices 6 are preferably devices which can generate an electromagnetic field with repulsive force after being powered on. According to the principle that two like polarities repel each other and two opposite polarities attract each other, the two magnetic devices 6 with opposite polarities generate repulsive force, upward lift force is increased with the assistance of the repulsive force under the condition that lift force has already been generated by the automobile body 1 in the traveling process of the automobile, and accordingly lift force of the wheels 28 is eliminated.

Specifically, the magnetic devices 6 can also be a plurality of permanent magnet materials with opposite polarities, magnetic fields with opposite polarities can be generated by the front sides and the back sides of the permanent magnet materials correspondingly for generating repulsive force, and particularly through the repulsive force generated between the lower surface of the flow disturbing plate 4 and the supporting plate 5, the automobile body 1 serving as the load space is made to generate lift force when the automobile is in a high-speed traveling state; meanwhile, through the repulsive force generated by the magnetic devices 6, the automobile body 1 is assisted in better suspending while generating lift force, and the lift force of the wheels 28 is eliminated at the same time.

As is shown in FIG. 1, it is common that the flow disturbing plate 4 can also be folded to be in a step shape for arrangement of containers or other different structures (not shown in FIGs) in the field. The above automobile is suitable for trucks with large load capacity or automobiles with a high chassis, and since the supporting plate 5 and the flow disturbing plate 4 are connected through the connecting devices 27, the automobile is quite suitable for trucks, passenger cars, jeeps and the like; it is common that the connecting devices 27 are connected with the wheels through the connecting shafts or other structures in the field.

When the automobile travels at a high speed, fluid enters the fluid channel 3 from the air inlet 30 in the front portion of the shell of the automobile and is discharged from the exhaust port 25 in the rear portion of the automobile body 1;

the flow disturbing surface 41 is arranged in the upper shell 8, and the path of the fluid passing through the upper shell 8 is made longer than the paths of the fluid passing through the lower shell 2 and the fluid channel 3, so that an upward pressure difference is generated to make the automobile body 1 generate greater lift force to be suspended.

Meanwhile, great downward pressures are generated due to the different paths and different flow speeds between the upper surface and lower surface of the flow disturbing plate 4 as well as between the upper surface and the lower surface of the supporting plate 5, the downward pressures are superposed and directly act on the wheels 28 to reduce or eliminate lift force, and thus in the traveling process of the automobile, the road holding capacity is higher, and the stability and safety are better. Furthermore, the automobile body is connected with the flow disturbing plate 4; the areas, corresponding to the one or two sets of wheels, of the supporting plate 5 are connected with the connecting shafts 29; the flow disturbing plate 4 is connected with the supporting plate 5 through the connecting devices 27; since flexible connection is achieved through the connecting devices 27, lift force is reduced or eliminated by the wheels 28 instead of being generated by the wheels 28 when the flow disturbing plate 4 and the automobile body generate lift force under the effect of the upward pressure.

The automobile body inevitably generates upward lift force when the automobile travels at a high speed; the higher the traveling speed of the automobile is, the larger the difference between the path of the fluid passing through the upper surface of the automobile body and the path of the fluid passing through the lower surface of the automobile body is, the greater the generated lift force is, and part or most part of the weight of the automobile or all the weight of the automobile is made to be suspended through the greater lift force.

Figure 4:
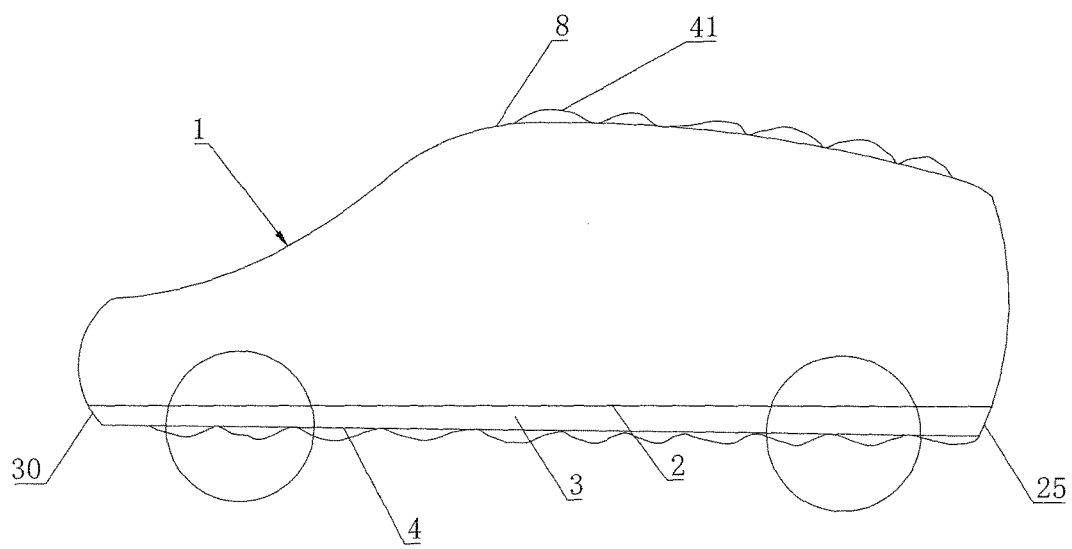
FIG. 4 is a structure schematic diagram of the invention.

Another embodiment: as is shown in FIG. 4, the embodiment is different from the above embodiment in that the connecting shafts 29 and the supporting plate 5 are removed for automobiles with low chassis, a fluid channel 3 with the front portion and the rear portion communicating with the outside is formed between the upper surface of the flow disturbing plate 4 and the lower shell of the automobile body, and the lower surface of the flow disturbing plate 4 is connected with the wheels 28 through the connecting devices 27.

According to an automobile disclosed in the invention, with the patent number being U.S. Pat. No. 9,278,719 B2, by the inventor, the lower portion of the automobile and a flow disturbing plate are connected through connecting devices to form a fluid channel, so that lift force is generated by an automobile body; the flow disturbing plate is further connected with wheels, so that lift force is eliminated by the wheels. Although the structure is simple and convenient to implement, the flow disturbing plate 4 equivalent to the chassis of a traditional automobile inevitably bears all the weight of the automobile body 1 serving as the load space, the weight of the chassis of the traditional automobile accounts for about a quarter to one third of the total weight of the automobile body, the weight of the flow disturbing plate 4 needs to be sufficiently increased to bear all the weight of the automobile body 1 for guaranteeing normal traveling of the automobile, and when the automobile travels, the automobile body generates lift force, but the flow disturbing plate does not generate lift force; on this basis, the inventor finds through further research and experiments that:

In the invention, the flow disturbing plate 4 and the automobile body 1 are connected, one end of each connecting device is connected with the flow disturbing plate, and the other end of each connecting device is connected with the corresponding wheel; when the automobile body 1 and the flow disturbing plate above the connecting devices 27 generate lift force and are suspended, the wheels 28 below the connecting devices reduce or eliminate lift force. In this way, the structure where the flow disturbing plate equivalent to the chassis of the automobile needs to bear all the weight of the automobile body and cannot generate lift force is avoided, and since the weight of the chassis of the traditional automobile accounts for about a quarter to one third of the total weight of the automobile body and energy is consumed according to the weight, a remarkable energy-saving effect is achieved, and the structure is simpler and more reasonable and can save more energy.

The second embodiment: as is shown in FIGS. 1-4, the second embodiment is different from the first embodiment in that the connecting shafts 29 and the supporting plate 5 are removed for automobiles with a low chassis. In the second embodiment, the number of the flow disturbing plates 4 is two, the two flow disturbing plates 4 are arranged between the left and right wheels 28 on the front portion of the automobile as well as between the left and right wheels 28 on the rear portion of the automobile correspondingly, the width of the flow disturbing plates 4 corresponds to the width of the wheels, and the area of each flow disturbing plate 4 can be increased or decreased according to requirements; although the areas of the flow disturbing plates 4 are not large, the flow disturbing plates 4 are connected with the wheels through connecting devices, and flow disturbing surfaces 41 for lengthening fluid passing paths are arranged on the lower surfaces of the flow disturbing plates 4, so that the paths of the fluid passing through the lower surfaces of the flow disturbing plates 4 are made longer than the paths of the fluid passing through the upper surfaces, which are planes, of the flow disturbing plates 4 and the paths of the fluid passing through fluid channels 3 formed between the upper surfaces of the flow disturbing plates 4 and the corresponding lower portions of the automobile, and accordingly downward pressures are generated and directly act on the wheels 28 to better reduce or eliminate the lift force of the wheels.

Furthermore, the flow disturbing plates 4 are arranged in the middle of the bottom of the automobile; the flow disturbing plates 4 can also be arranged in the middle of the bottom of the automobile and/or between the left and right wheels 28 (not shown in FIGs), and the flow disturbing plates 4 are connected with the connecting devices 27 and the wheels through corresponding connecting ways, for example, the connecting devices of the truck are connected with the wheels through the connecting shafts, or the connecting devices are connected with the wheels through suspension devices of a traditional automobile, and other common structures in the field are not illustrated in detail any more.

The upper portion of the traditional automobile is an arc shape, the lower portion of the traditional automobile is planar, lift force is generated since continuous fluid reaches the rear portion at the same time, and for over a hundred years the lift force has been overcome by increasing the weight of the automobile, and consequentially more energy is wasted; the suspension automobile of the invention is similar to the traditional automobile in that the upper portion of the suspension automobile is also in an arc shape, and the suspension automobile of the invention is different from the traditional automobile in that lift force is overcome through the pressure difference generated by the flow disturbing plates instead of the weight; before the continuous fluid reaches the rear portion of the automobile at the same time, the downward pressure generated when the continuous fluid passing through the flow disturbing plates on the lower portion of the automobile directly acts on the wheels to reduce or eliminate lift force; when the continuous fluid reaches the rear portion at the same time, the automobile body is made to generate lift force. In this way, by arranging the flow disturbing surfaces on the lower surfaces of the flow disturbing plates on the lower portion of the automobile, lift force can be generated by the automobile body and eliminated by the wheels.

In addition, the biggest difference between the suspension automobile of the invention and the traditional automobile is that the weight increasing method is adopted by the traditional automobile for overcoming lift force, on the contrary, the flow disturbing surface is arranged on the upper portion of the automobile of the invention, so that greater lift force is generated to overcome more gravity, and lift force can also be generated when the automobile travels at a medium or low speed to overcome part of the gravity; in this way, by arranging the flow disturbing surface on the upper portion of the automobile body, the greater pressure difference and lift force are generated between the upper portion and the lower portion to overcome more gravity, and the automobile body can be better suspended.

Furthermore, the flow disturbing surfaces for lengthening the fluid passing paths are locally or integrally arranged on the upper portion of the automobile body and/or the lower surfaces of the flow disturbing plates, so that lift force is generated by the automobile body and eliminated by the wheels.

Figure 5:
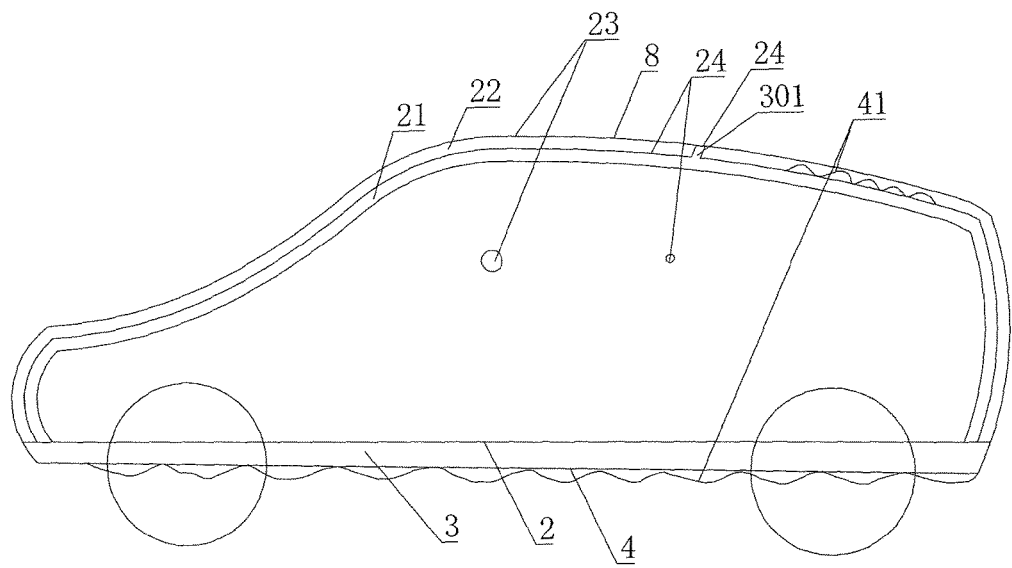
FIG. 5 is a structure schematic diagram of the invention.

The third embodiment: as is shown in FIG. 5, the third embodiment provides another suspension automobile and is different from the first embodiment and the second embodiment in that an outer fluid channel 22 and an inner fluid channel 21 are sequentially arranged in the whole or part of an automobile body 1 (except the automobile bottom) surrounding the automobile from outside to inside, the inner fluid channel communicates with the outer fluid channel 22 through a plurality of second air ports 24, and/or communicates with the outside through a plurality of communication pipes 301, and the outer fluid channel 22 communicates with the outside through a plurality of first air ports 23 formed in the shell.

The ventilation areas of the first air ports 23 are larger than the ventilation areas of the second air ports 2 and the ventilation areas of the communication pipes 301, and even much larger than the ventilation areas of the second air ports 2 and the ventilation areas of the communication pipes 301. A flow disturbing surface 41 is integrally or locally arranged in the outer fluid channel 22, the flow disturbing surface 41 is preferably composed of a plurality of flow disturbing strips provided with spiral outer surfaces and evenly distributed in the outer fluid channel 22, each spiral flow disturbing strip can make fluid pass through a long spiral path circle by circle, and the fluid passing path in the outer fluid channel 22 can be easily lengthened by multiple times or even tens of times by the multiple spiral flow disturbing strips; a pressure difference is generated due to the different flow speeds between the inner fluid channel and the outer fluid channel, and even a tens of times outward pressure difference transferring ring is generated and is opposite to the surrounding inward fluid pressure when the automobile travels; the fluid pressures in two different directions are encountered on the shell of the automobile body 1 and are mutually counteracted, and the corresponding quantity of fluid resistance is reduced according to the quantity of counteracted fluid pressures.

Furthermore, an outer fluid channel 22 and an inner fluid channel 21 are formed in the whole or part of the automobile body 1 (including the automobile bottom) surrounding the automobile.

When the automobile travels, surrounding fluid with a flow speed equal to the speed of the automobile enters the outer fluid channel 22 through a plurality of first air ports 23 which are evenly formed in the automobile body 1, and enters the inner fluid channel 21 through a plurality of second air ports 24 and/or a plurality of communication pipes 301, barriers can also be arranged in the inner fluid channel to prevent the fluid from flowing smoothly, and thus the flow speed is decreased; since the ventilation areas of the first air ports 23 are much larger than the ventilation areas of the second air ports 24 and the ventilation areas of the communication pipes 301, fluid with a flow speed equal to the speed of the automobile can enter the inner fluid channel 21 only through the second air ports 24 with small ventilation areas and/or the communication pipes 301 with small ventilation areas, and in the process, the flow speed in the inner fluid channel 21 is obviously decreased and is lower than the flow speed around the automobile and even lower than the flow speed in the outer fluid channel 22 provided with the flow disturbing surface 41.

The fluid near the multiple first air ports 23 which are evenly distributed in the shell of the automobile body 1 enters the outer fluid channel 22 provided with the flow disturbing surface 41 through the multiple air ports 23, so that the flow speed on the surface of the shell of the automobile body 1 and the flow speed in the outer fluid channel 22 are increased to form two approximately identical high-speed fluid layers which communicate with each other and have high flow speeds jointly, greater pressure differences are generated due to the different flow speeds between the high-speed fluid layers and the fluid in the inner fluid channel 21 with a flow speed lower than the speed of the automobile, and accordingly a pressure difference transferring ring from inside to outside is formed around the automobile and is opposite to the pressure direction, from outside to inside, of the fluid around the automobile; the fluid pressures in two different directions are encountered and are mutually counteracted according to natural law, the corresponding quantity of fluid resistance is reduced according to the quantity of counteracted fluid pressures, and a corresponding propelling power source is obtained by reducing the fluid resistance.

The larger the flow speed difference between the inner fluid channel and the outer fluid channel is, the larger the generated pressure difference is, and the greater the obtained propelling force source is. In this way, the novel propelling force source is obtained by reducing the fluid resistance as follows:

An inner fluid layer and an outer fluid layer which have different flow speeds are formed around a movement device: the power source is obtained if the flow speed of the inner layer is lower than the flow speed of the outer layer, otherwise, power consumption is increased.

During high-speed traveling of any movement device including an automobile, the flow speed of the inner fluid layer near a shell is approximately equal to the movement speed of the movement device and is decreased gradually towards the outside until the outer fluid layer with the flow speed equal to the environment flow speed within a wide range, namely the flow speed of the inner layer is higher than the flow speed of the outer layer; at the moment, the high pressure generated by the low flow speed of the outer layer within the wide range inevitably transfers a pressure difference to the low pressure generated by the low flow speed of the inner layer, the greater fluid pressure of the outer layer around the environment is actually guided to the movement device, consequentially any movement device including an automobile has to consume slightly over 85% of its energy to overcome fluid resistance during high-speed traveling, the utilization rate of energy actually used for driving the automobile to travel is only about 15%, and this is the new understanding about the generation source of the fluid resistance of the invention.

On the contrary, in the invention, the flow speed of the inner layer is lower than the flow speed of the outer layer, the larger the flow speed difference between the inner layer and the outer layer is, the more the counteracted fluid pressures are, and the more the converted propelling force source is. Obviously, the unique difference between the invention and the traditional movement device is that:

Opposite results are obtained since the directions of fluid pressures borne by the shell of the automobile are different.

Generally, the actual energy utilization rate is only about 15% when the automobile travels at the speed of 100 km/h, about 85% of the energy is consumed for overcoming fluid resistance, and most of the energy is consumed by the automobile for overcoming the fluid resistance; however, a pressure difference transferring ring which is at least tens of times greater is generated between the inner fluid channel and the outer fluid channel of the invention so that most of the inward fluid pressure of the surrounding fluid can be counteracted easily, for example, at least over 60% of the propelling force source can be obtained by counteracting 15% of the fluid pressure, and a greater propelling force source can be obtained if 30% or 50% or even more fluid pressure is counteracted. The novel propelling force source is obtained by reducing the fluid resistance in the invention.

Furthermore, the outer fluid channel 22 communicates with the exhaust port 25 formed in the rear portion of the automobile body 1 shown in FIG. 1, the exhaust port 25 can also be formed in the middle-lower area of the rear portion of the automobile body 1, and it is common in the field that a large quantity of high-speed fluid exhausts air outwards from the exhaust port 25 in the rear portion of the automobile to better fill the negative-pressure area on the rear portion (not show in FIGs), and thus the fluid resistance is further reduced. The other parts of the embodiments 1-3 are the same, the automobile body 1 of the suspension automobile of the invention generates lift force to better suspend it, the wheels 28 eliminate lift force, and meanwhile the novel propelling force source is obtained by reducing the fluid resistance.

Figure 6:
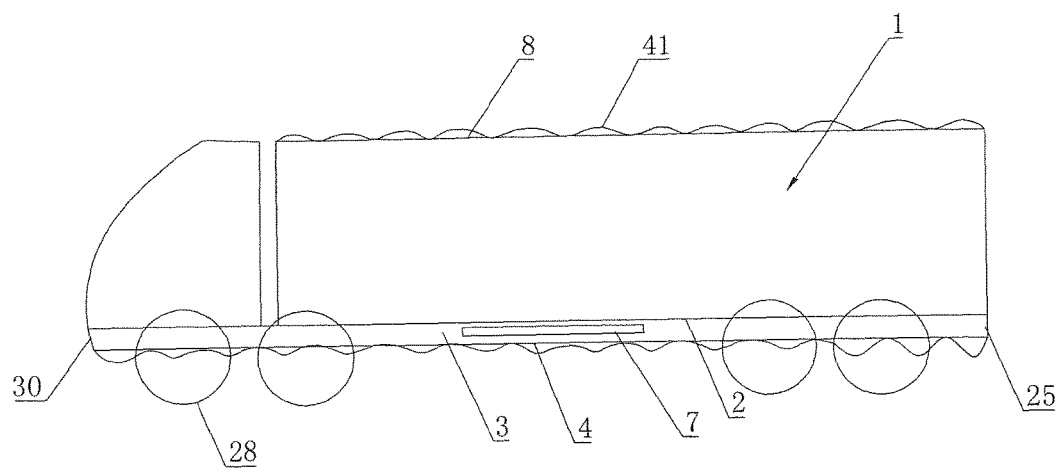
FIG. 6 is a structure schematic diagram of the invention.
Figure 7:
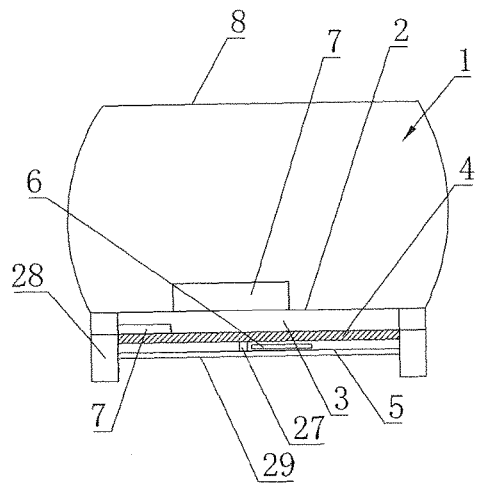
FIG. 7 is a rear-view structure schematic diagram of the invention.
Figure 8:
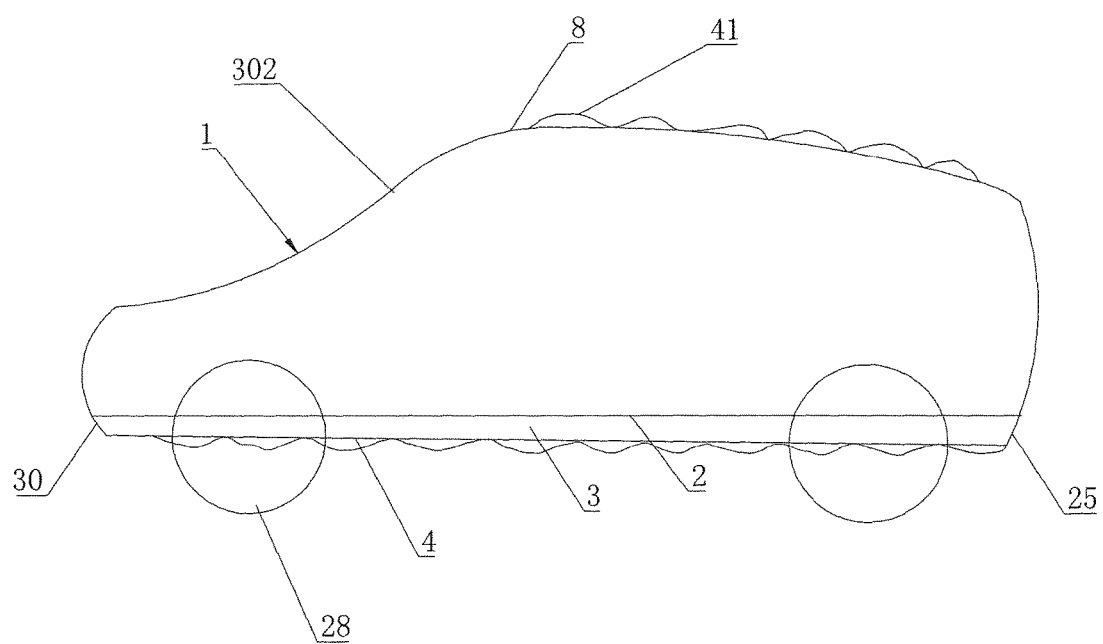
FIG. 8 is a structure schematic diagram of the invention.
Figure 12:
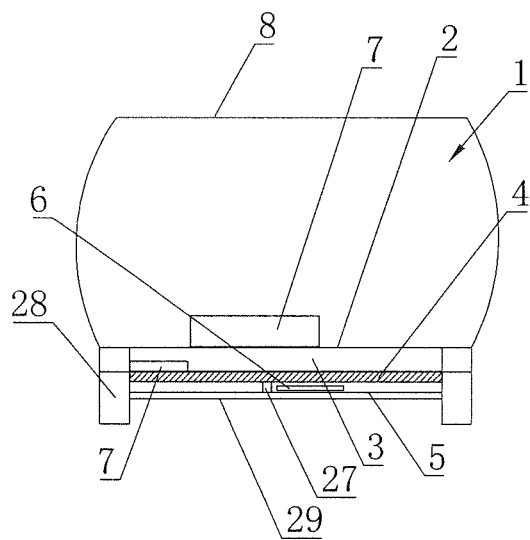
FIG. 12 is a rear-view structure schematic diagram of the invention
Figure 13:
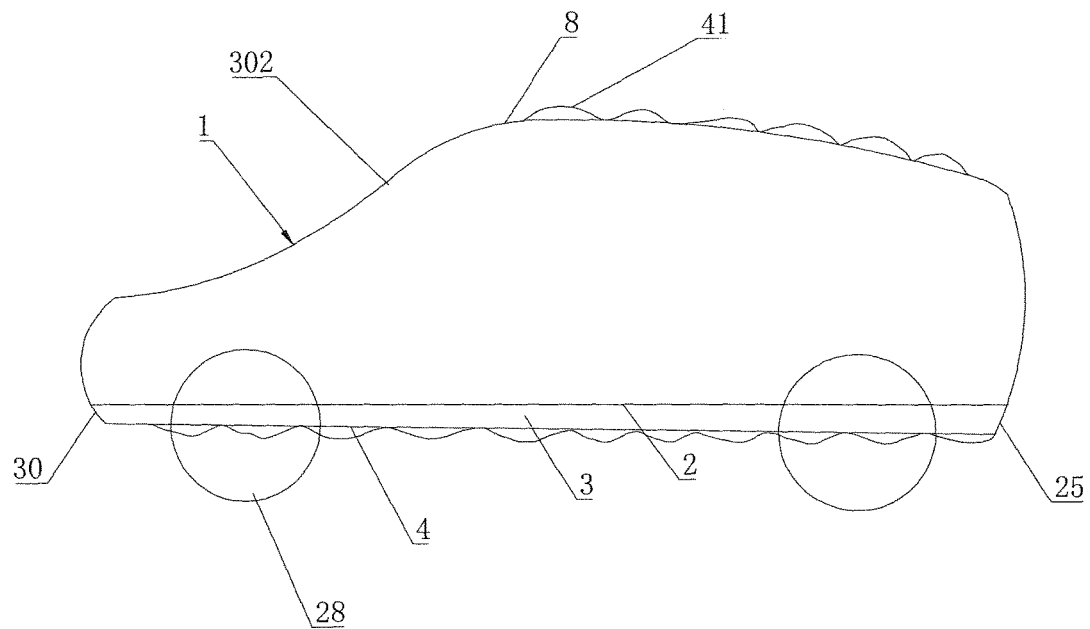
FIG. 13 is a structure schematic diagram of the invention.

The fourth embodiment: please see FIG. 6 and FIG. 7, as is shown in FIG. 12 and FIG. 13, the fourth embodiment is different from embodiments 1-3 in that a suspension automobile driven by various kinds of energy is provided.

A power device 7 comprises storage batteries or fuel batteries of an electric driving device, and is arranged on the upper surface and/or the lower surface of a flow disturbing plate 4; preferably, a plurality of heavy battery devices of the power device 7 are arranged on the two side edges of the interior of the fluid channel 3 in the upper surface of the flow disturbing plate 4 so that fluid can pass through the fluid channel 3 without being affected. As is shown in FIG. 7, the power device 7 is arranged in the shell of the automobile body 1; the heavy battery devices are suspended accordingly when the automobile body 1 is suspended under the effect of the lift force, and thus energy is remarkably saved.

What is important is that the weight of the battery devices accounts for about a quarter to one third of the total weight of the automobile, energy is consumed according to the weight, energy loss is further increased to a great extent by the total weight of the automobile body and the battery devices of the traditional automobile, and the development of automobiles driven by electric energy is seriously affected.

However, the weight of the automobile body 1 and the weight of the battery devices of the suspension automobile of the invention are located in the fluid channel 3 or the shell of the automobile body 1, and the battery devices generate lift force together with the automobile body 1 to suspend in the traveling process.

When the automobile travels at a high speed, the automobile body 1 which serves as the whole load space and has the weight accounting for 90% of the weight of the automobile, and the battery devices with the weight accounting for about one third of the weight of the automobile are partly, mostly, or completely suspended, downward gravity generated by the self weight is overcome, the battery devices with the weight accounting for about one third of the total weight of the automobile are also suspended along with the automobile body 1, and the weight actually borne by the wheels 28 is less than about 10% of the automobile; in this way, the actual energy consumption of the suspension automobile is extremely low, the biggest problem, not solved in many years, of electric automobiles is the short travel mileage, however, the travel mileage of electric automobiles can be remarkably increased and even increased by multiple times through the suspension automobile.

The fifth embodiment: as is shown in FIG. 7, FIG. 8, FIG. 12 and FIG. 13, the fifth embodiment provides a suspension automobile driven by solar energy and is different from the fourth embodiment in that the upper portion of the automobile body 1 and the two sides of the shell are covered with solar devices 302, and the solar devices 302 absorb solar energy through solar panels or solar films, convert the solar energy into electric energy and store the electric energy in the power device 7. When the automobile body 1 is suspended under the effect of lift force during traveling of the automobile, the heavy battery devices contained in the automobile body 1 are suspended accordingly, the wheels 28 with the weight accounting for less than 10% of the total weight of the automobile eliminate lift force, and energy needs for driving the automobile are extremely low at the moment, and thus the solar automobile can be driven to travel normally extremely easily.

The sixth embodiment: the sixth embodiment is different from the fourth embodiment and the fifth embodiment in that a suspension automobile driven by compressed gas is provided, as is shown in FIG. 7, the power device 7 is a gas storage tank for storing compressed gas, the gas storage tank is arranged in the automobile body 1, and the heavy gas storage tank contained in the automobile body 1 is suspended accordingly when the automobile body 1 is suspended under the effect of lift force.

Furthermore, compressed gas in the gas storage tank is controlled to directly drive pneumatic motors arranged in the wheels 28 to rotate through guide pipes, the wheels 28 are driven to rotate, and accordingly the automobile is driven.

Furthermore, high-pressure gas in the gas storage tank can be controlled to communicate with an automotive engine arranged in the automobile body 1 through a guide pipe, a piston in an air cylinder of the engine is driven by the high-pressure gas to drive a connecting-rod crankshaft, and accordingly the automobile is driven. Preferably, the gas storage tank is arranged on the front portion or/and the rear portion of the interior of the automobile body 1, and the compressed gas in the gas storage tank can easily drive the automobile to travel normally. An automobile driven by compressed gas can also be matched with at least one of the automobiles driven by electric energy, the automobiles driven by solar energy and automobiles driven by other forms of energy, and various kinds of energy are matched to drive the automobile to travel.

The suspension automobile is suitable for various automobiles of different automobile types, and is also suitable for automobiles driven by various kinds of clean energy, and on the premise that the basic structure and appearance of various automobiles are not changed, the various automobiles can remarkably save energy by the adoption of the suspension automobile.

Figure 9:
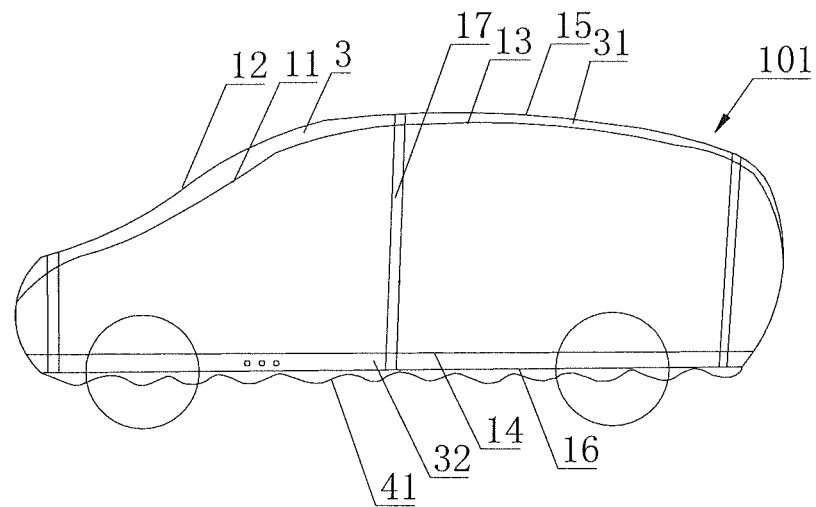
FIG. 9 is a structure schematic diagram of the invention.
Figure 10:
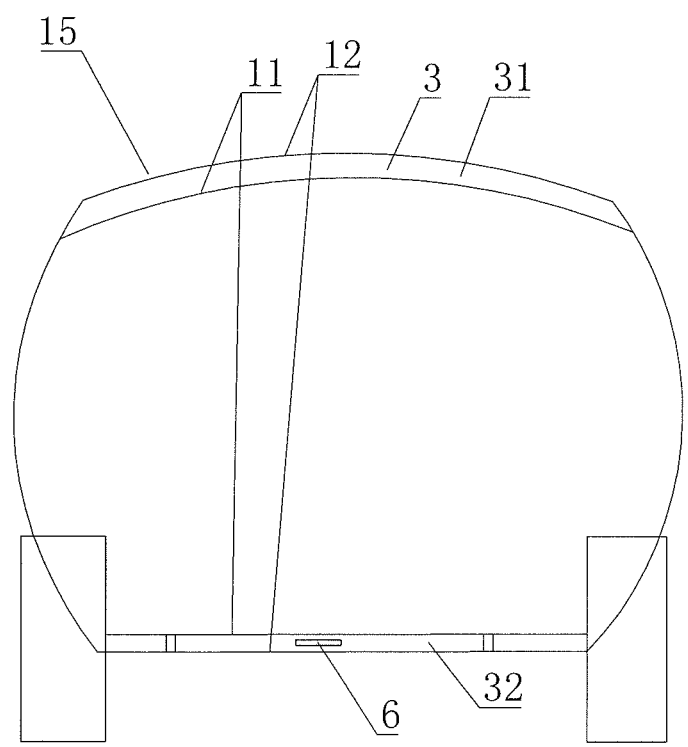
FIG. 10 is a rear-view structure schematic diagram of the invention.

The eighth embodiment: as is shown in FIG. 9 and FIG. 10, a suspension automobile is composed of an automobile 11 and a combined plate 12, wherein the combined plate 12 is formed by connecting an upper plate 15 with the upper portion and the lower portion being of plate-like structures and a lower plate 16 with the upper portion and the lower portion being of plate-like structures through two or more supporting frames 17; the lower plate 16 is connected with wheels 16. The automobile 11 is arranged between the upper plate 15 and the lower plate 16, a first fluid channel 31 located between the upper surface 13 of a shell of the automobile and the upper plate 14 and a second fluid channel 32 located between the lower surface 14 of the shell of the automobile and the lower plate 16 are formed, and the front portion and the rear portion of the first fluid channel 31 and the front portion and the rear portion of the second fluid channel 32 communicate with the outside.

Furthermore, the supporting frames 17 are each of a strip-shaped or arc-shaped structure, and can also be each of a hollow or solid structure, specifically, the supporting frames 17 preferably can freely penetrate through the shell of the automobile 11 to be connected with the upper plate 15 and the lower plate 16, and the multiple supporting frames 17 can freely penetrate through the shell of the automobile 11; when the automobile travels at a high speed, downward pressure is generated due to the different flow speeds between the upper plate 15 and the lower plate 16 to eliminate lift force, and since the supporting frames 17 can freely penetrate through the shell of the automobile 11 and cannot be seen from the outside of the shell, the appearance is more attractive. More importantly, the automobile is not driven by the downward pressure generated by the combined plate 12, and thus the automobile 11 arranged between the upper plate 15 and the lower plate 16 can generate upward lift force due to the flow speeds of the upper surface and the lower surface without being affected.

Furthermore, the supporting frames 17 penetrate through the shell of the automobile 11 and/or are arranged outside the shell of the automobile to be connected with the upper plate 15 and the lower plate 16, and thus the automobile arranged in the middle of the combined plate 12 can generate lift force due to the flow speeds of the upper surface and the lower surface without being affected.

Furthermore, the combined plate 12 can be locally or integrally arranged on the upper surface and the lower surface of the automobile, so that the first fluid channel 31 and the second fluid channel 32 are formed, for example, the upper plate 15 can be arranged on the front portion of the upper portion of the automobile or the middle portion or the rear portion of the automobile or the whole automobile body; the lower plate 16 connected with the wheels can also be locally or integrally arranged at the bottom of the automobile.

Generally, the upper portion of an automobile is in an arc shape, and the lower portion of the automobile is planar, so that lift force is generated under the effect of continuous fluid around when the automobile travels; the upper portion and the lower portion of the suspension automobile of the invention are the same as those of the traditional automobile, namely the upper surface of the automobile is in an arc shape, and the lower surface of the automobile is planar; in this way, the second fluid channel 32 is formed by the lower plate 16 and the corresponding planar lower surface 14 of the automobile jointly.

Furthermore, a flow disturbing device is locally or integrally arranged on the upper surface 13 of the automobile 11 to lengthen the fluid passing path, greater upward pressure differences and lift force are generated by the automobile 11 due to the different flow speeds between the upper surface 13 and the lower surface 14, which is a plane, of the automobile 11 and the different flow speeds between the first fluid channel 31 and the second fluid channel 32, certain lift force can also be generated when the automobile travels at a medium or low speed to overcome downward gravity, the automobile can better be suspended in the first fluid channel and the second fluid channel when traveling at a high speed and more downward gravity is overcome, and energy is saved by overcoming the gravity of the automobile.

Furthermore, the upper surface of the lower plate 16 is a plane and is provided with a flow disturbing surface 41, so that the path of fluid passing through the upper surface of the lower plate 16 is made longer than the path of the fluid passing through the upper surface of the lower plate 16 and the path of the fluid passing through the second fluid channel 32, the downward pressure generated due to the different flow speeds between the upper surface and the lower surface of the lower plate 16 directly acts on the wheels, and accordingly downward pressure is generated by the wheels connected with the lower plate 16 to completely eliminate lift force.

Furthermore, since the lower plate 16 does not bear weight, the weight is low, and the area is large; vibration is prone to being generated when the automobile travels, and a plurality of elastic devices 303 are arranged in the first fluid channel and the second fluid channel to effectively reduce the vibration; at the moment, the automobile 11 located between the upper plate 15 and the lower plate 16 generates lift force to suspend the vehicle due to the different fluid passing paths on the upper surface and the lower surface of the automobile, the upper plate 15 bears the high pressure generated by low-flow-speed fluid on the upper portion of the automobile at the same time, a pressure difference is transferred to the low pressure generated by high-flow-speed fluid of the lower plate 16 through the supporting frames 17 freely penetrating through the shell of the automobile, and the pressure difference generated by the fluid is invisibly pressed on the outer surface of the upper plate 15 of the automobile; since the supporting frames 17 can freely penetrate through the automobile 11, the pressure difference from top to bottom is transferred to the lower plate 16 connected with the wheels to complete eliminate lift force, and the automobile 11 can generate upward lift force without being affected by the upper plate 15 and the lower plate 16 in the process.

Since the pressure difference from top to bottom is borne by the combined plate 12, lift force can be completely eliminated for the automobile; the automobile 11 is arranged in the first fluid channel 31 and the second fluid channel 32 between the upper plate 15 and the lower plate 16, and thus the automobile 11 serving as the load space is suspended due to the greater pressure differences and lift force generated between the upper portion and the lower portion.

The light supporting frames 17 are connected with the light upper plate 15 and the light lower plate 16, and the self weight of the lower plate 16 and the self weight of the wheels connected with the lower plate 16 are not high and account for about 10% of the weight of the automobile; the automobile 11 serves as the whole load space of the automobile body, and heavy structural components such as the automotive engine are further contained in the load space; the automobile 11 serving as the whole load space contains various heavy structural components, and thus the weight of the automobile 11 accounts for about 90% of the total weight of the automobile.

Baffles can further be arranged between the left and right side faces and the lower plate 16 (as is shown in FIG. 9) of the automobile, and a plurality of air ports are formed in the baffles and communicate with the fluid channel 3, so that the ventilation capacity of the fluid channel 3 is further improved. According to the invention, the automobile body generates lift force to be suspended, and the wheels actually bear an extremely small amount of the weight of the automobile body, so that the pressure borne by the wheels in the long-term using process is extremely low, and both the service life of the wheels and the service life of the roads can be prolonged by multiple times.

When the automobile travels at a high speed, the fluid rapidly passes around the automobile, the first fluid channel 31 and the second fluid channel 32 which communicate with the outside are formed in the upper portion and the lower portion of the automobile correspondingly, the flow disturbing device used for lengthening the fluid passing path is arranged on the upper surface 13, in the first fluid channel 31, of the automobile 11, and thus the path of the fluid passing through the upper surface 13 of the automobile 11 is made longer than the path of the fluid passing through the lower surface 14, which is a plane, in the second fluid channel 32 to generate the pressure difference and lift force, and the combined plate 12 connected with the wheels is prevented from being driven to generate lift force when the automobile 11 generates upward lift force to be suspended; on the contrary, the combined plate 12, of the plate-like structure, connected with the wheels eliminates lift force due to the different flow speeds between the upper plate 15 and the lower plate 16, and the contradictory structures that the shell of the automobile 11 generates lift force and the wheels eliminate lift force are perfectly unified in the invention.

Figure 11:
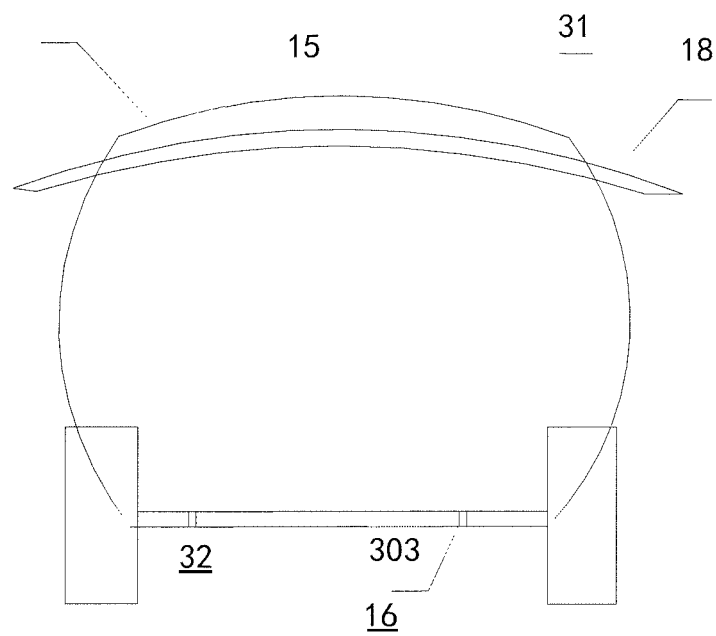
FIG. 11 is a structure schematic diagram of the invention.

The ninth embodiment: please see FIG. 11, the ninth embodiment provides a suspension automobile and is different from the eighth embodiment in that wings 18 are locally or integrally arranged on the upper side of the upper surface 13 or the left side and right side of the automobile 11, and under the control of a control mechanism, the shapes and angles of the wings 18 can be changed to form larger wing planes so that the automobile 11 can generate greater lift force, Specifically, the upper surface of each wing 18 is an arc-shaped surface, the lower surface of each wing 18 is a plane, the wings 18 are similar to the wing structure of an airplane, and the automobile 11 can better generate lift force through the arrangement of the wings 18. Under the control of the control mechanism, the wings 18 can freely stretch and retract, the angles of the wings 18 can be changed freely, and thus the wings 18 can extend outwards from the upper surface 13 or the left side and right side of the automobile in parallel or in an angled mode to form larger wing planes, or the wings 18 can extend outward by certain distances in the left-right direction or front-back direction of the center axis of the upper surface 13 of the automobile 11 to form larger wing planes, the paths of fluid passing through the wing planes of the wings 18 are lengthened, and the areas of the wing planes of the wings 18 can be controlled in a user-defined mode through the control mechanism. When the fluid passes through the wing planes, the windward area of the upper surface 13 of the automobile body 11 is enlarged, the fluid passing path is prolonged, a greater pressure difference can be generated more easily due to the different flow speeds between the upper surface 13 and the lower surface 14 of a planar structure, and accordingly greater lift force is generated to make the automobile 11 better suspend.

Furthermore, the wings 18 can also be arranged on the left side face and the right side face (not show in FIGs) of the automobile 11, and for preventing the sights of a left side window and a right side widow of the automobile 11 from being affected, the wings 18 are preferably made of transparent materials; the wings 18 located on the left side face and the right side face can be turned from bottom to top to form larger wing planes under the control of the control mechanism in the using process, the windward area is further enlarged, the fluid passing path is further prolonged, and thus the automobile can generate greater lift force more easily.

Furthermore, flow disturbing surfaces 41 are arranged on the upper surfaces of the wings to further lengthen the fluid passing paths, so that greater pressure differences and lift force are generated between the upper surfaces and the lower surfaces of the wings, and accordingly the automobile 11 can better suspend.

In conclusion, the invention changes the general common sense that wheels bear all the self weight, loads, and gravitational acceleration of an automobile.

The general common sense that fluid resistance is guided to the traditional automobile is changed, so that the novel propelling force source is obtained by reducing the fluid resistance, and the suspension automobile is provided and is suitable for various automobile types and various kinds of energy, such as suspension automobiles driven by the clean energy including engines, electric energy, solar energy, compressed gas and the like; energy is remarkably saved on the premise that the basic structure and appearance of various automobiles are not changed.

The mutual contradictory structures where the automobile body of the automobile generates lift force and wheels of the automobile eliminate lift force are unified harmoniously in the invention.

The invention claimed is:

1. A suspension automobile, comprising an automobile body and wheels, wherein the suspension automobile further comprises a flow disturbing plate, wherein the flow disturbing plate connected with the automobile body is connected with the wheels through connecting devices, and a fluid channel with the front portion and the rear portion communicating with the outside is formed between the upper surface of the flow disturbing plate and the lower portion of the automobile body; the lower surface of the flow disturbing plate is flow disturbing surface, the flow speed over the lower surface of the flow disturbing plate is higher than the flow speed over the upper surface of the flow disturbing plate to generate pressure difference to make the wheels eliminate lift force, the flow speed of fluid passing through the fluid channel is made lower than the flow speed of the fluid passing through the upper portion of the automobile body, a pressure difference is generated between the upper portion and the lower portion of the automobile body to make the automobile body generate lift force; the connecting devices are flexible structures, and thus the wheels are prevented from being driven to generate lift force when the whole automobile body generates lift force.

2. The suspension automobile according to claim 1, wherein the flow disturbing surfaces for lengthening the fluid passing paths are each-composed of a plurality of arc flow disturbing strips or triangular flow disturbing strips or trapezoidal flow disturbing strips or spiral trapezoid flow disturbing strips which are concave and convex relative to the surfaces, and the flow disturbing surfaces are also composed of ripples which are at least one of symmetrical in the longitudinal direction and symmetrical in the transverse direction, the flow disturbing surfaces are also composed of ripples which are at least one of asymmetrical in the longitudinal direction and asymmetrical in the transverse direction; the flow disturbing surfaces make fluid pass around a spiral path of the spiral trapezoid flow disturbing strips circle by circle.

3. The suspension automobile according to claim 1, wherein the connecting devices are elastic or hydraulic or pneumatic connecting devices, one end of each connecting device is connected with the flow disturbing plate, and the other end of each connecting device is connected with the corresponding wheel so that the wheels can eliminate lift force without being affected when the automobile body generates lift force.

4. The suspension automobile according to claim 1, wherein the suspension automobile further comprises a supporting plate, and the supporting plate connected with the wheels is connected with the flow disturbing plate through connecting devices.

5. The suspension automobile according to claim 1, wherein the suspension automobile further comprises magnetic devices, magnetic poles, facing each other, of the magnetic devices are opposite, and the magnetic devices are arranged between the supporting plate and the flow disturbing plate; the flow disturbing plate is connected with the supporting plate through the connecting devices, the connecting devices are elastic or hydraulic or pneumatic structures.

6. The suspension automobile according to claim 1, wherein the flow disturbing plate is locally or integrally arranged at the bottom of the automobile, and arranged in at least one of the whole bottom of the automobile and the middle of the bottom of the automobile and between the left wheels and right wheels of the automobile through connecting pieces.

7. The suspension automobile according to claim 1, wherein the power device comprises an electric driving device, and storage batteries or fuel batteries of the electric driving device are contained in the automobile body and are suspended along with the lift force generated by the automobile body.

8. The suspension automobile according to claim 1, wherein the power device comprises a solar driving device, wherein the solar driving device comprises solar devices arranged on the outer surface of the automobile body in a covering mode and storage battery devices used for storing electric energy, the solar devices convert solar energy into electric energy and then store the electric energy in the storage battery devices, and the storage battery devices are contained in the automobile body and suspend along with the lift force generated by the automobile body.

9. The suspension automobile according to claim 1, wherein the power device comprises a compressed gas driving device, wherein the compressed gas driving device further comprises a gas storage tank located in the automobile body and guide pipes connected with the gas storage tank, and the guide pipes are connected with an automotive engine to drive the engine to work, or the guide pipes communicate with pneumatic motors arranged on the wheels to drive the wheels to rotate; the gas storage tank is suspended along with the lift force generated by the automobile body.

10. The suspension automobile according to claim 1, wherein flow disturbing surfaces are provided at the upper portion of the automobile body.

11. The suspension automobile according to claim 10, wherein the flow disturbing surfaces for lengthening the fluid passing paths are each composed of a plurality of arc flow disturbing strips or triangular flow disturbing strips or trapezoidal flow disturbing strips or spiral trapezoid flow disturbing strips which are concave and convex relative to the surfaces, and the flow disturbing surfaces are also composed of ripples which are at least one of symmetrical in the longitudinal direction and symmetrical in the transverse direction, the flow disturbing surfaces are also composed of ripples which are at least one of asymmetrical in the longitudinal direction and asymmetrical in the transverse direction; the flow disturbing surfaces make fluid pass around a spiral path of the spiral trapezoid flow disturbing strips circle by circle.

12. A suspension automobile, comprising an automobile body and wheels; wherein the suspension automobile comprises an automobile body and wheels; wherein an inner fluid channel and an outer fluid channel which communicate with the outside are arranged in a shell surrounding the automobile body, and a flow disturbing surface for lengthening the fluid passing path is arranged in the outer fluid channel; the outer fluid channel communicates with the outside through two or more first air ports; the inner fluid channel communicates with the outside through two or more second air ports; ventilation areas of the first air ports are larger than ventilation areas of the second air ports; so that the flow speed in the outer fluid channel is made higher than the flow speed in the inner fluid channel, and accordingly a pressure difference is generated, the pressure difference and a pressure of the fluid around the shell offset each other because of their opposite pressure directions;

the suspension automobile further comprises a flow disturbing plate, wherein the flow disturbing plate connected with the automobile body is connected with the wheels through connecting devices, a fluid channel communicating with the outside is formed between the upper surface of the flow disturbing plate and the lower portion of the automobile body, so the flow speed of fluid passing through the fluid channel is made lower than the flow speed of the fluid passing through the upper portion of the automobile body, a pressure difference is generated between the upper portion and the lower portion of the automobile body to make the automobile body generate lift force; the lower surface of the flow disturbing plate is flow disturbing surface, so the flow speed over the lower surface of the flow disturbing plate is higher than the flow speed over the upper surface of the flow disturbing plate to generate pressure difference to make the wheels eliminate lift force; the connecting devices are flexible structures, and the wheels are prevented from being driven to generate lift force when the whole automobile body generates lift force.

13. The suspension automobile according to claim 12, wherein the inner fluid channel communicates with the outside through communication pipes and the second air ports formed in the shell.

14. The suspension automobile according to claim 12, wherein the flow disturbing surface is arranged on the upper portion of the automobile body, so that the path of fluid passing through the upper portion of the automobile body is made longer than the path of the fluid passing through the lower portion of the automobile body, and accordingly the lift force is generated by the automobile body; the flow disturbing surface is arranged on the lower surface of the flow disturbing plate, so that the path of the fluid passing through the lower surface of the flow disturbing plate is made longer than the path of the fluid passing through the upper surface of the flow disturbing plate, and accordingly the lift force is eliminated by the wheels; the flow disturbing surfaces are each composed of a plurality of arc flow disturbing strips or triangular flow disturbing strips or trapezoidal flow disturbing strips or spiral flow disturbing strips which are concave and convex relative to the surfaces, and the flow disturbing surfaces are also composed of ripples which are at least one of symmetrical in the longitudinal direction and/or symmetrical in the transverse direction, the flow disturbing surfaces are also composed of ripples which are at least one of asymmetrical in the longitudinal direction and asymmetrical in the transverse direction; the flow disturbing surfaces make fluid pass around a spiral path of the spiral trapezoid flow disturbing strips circle by circle.

15. The suspension automobile according to claim 12, wherein the lower surface of the flow disturbing plate comprises the flow disturbing surfaces which are concave and convex relative to the surfaces, the connecting devices are elastic or hydraulic or pneumatic connecting devices.

16. A suspension automobile comprising an automobile and a combined plate, wherein the combined plate is formed by connecting an upper plate and a lower plate through two or more supporting frames, fluid channels communicating with the outside are formed between the upper surface of the automobile and the upper plate as well as between the lower surface of the automobile and the lower plate correspondingly, the lower plate is connected with wheels through connecting devices, and flow disturbing surfaces for lengthening fluid passing paths are arranged on the upper surface of the automobile and/or the lower surface of the lower plate, so that the lift force is generated by the automobile and eliminated by the wheels.

17. The suspension automobile according to claim 16, wherein the fluid channels include the first fluid channel and the second fluid channel; the first fluid channel is formed between the upper surface of the automobile and the upper plate, the second fluid channel is formed between the lower surface of the automobile and the lower plate, the flow speed of fluid within the first fluid channel is made larger than the flow speed of the fluid within the second fluid channel to make the automobile generates lift force; the supporting frames are arranged at least one of inside and outside the shell of the automobile, and the supporting frames arranged inside the shell freely pass through the interior of the shell; the automobile is connected with the combined plate by flexible structures of the connecting devices, and the wheels are prevented from being driven to generate lift force when the automobile generates lift force.

18. The suspension automobile according to claim 16, wherein the flow disturbing surface is arranged on the upper surface of the automobile, so that the path of fluid passing through the upper surface of the automobile is made longer than the path of the fluid passing through the lower surface of the automobile, and accordingly the lift force is generated by the automobile; the flow disturbing surface is arranged on the lower surface of the lower plate, so that the path of the fluid passing through the lower surface of the lower is made longer than the path of the fluid passing through the upper surface of the lower plate, and accordingly the lift force is eliminated by the wheels; the flow disturbing surfaces are each composed of a plurality of arc flow disturbing strips or triangular flow disturbing strips or trapezoidal flow disturbing strips or spiral flow disturbing strips which are concave and convex relative to the surfaces, and the flow disturbing surfaces are also composed of ripples which are at least one of symmetrical in the longitudinal direction and symmetrical in the transverse direction, the flow disturbing surfaces are also composed of ripples which are at least one of asymmetrical in the longitudinal direction and asymmetrical in the transverse direction; the flow disturbing surfaces make fluid pass around a spiral path of the spiral trapezoid flow disturbing strips circle by circle.

19. The suspension automobile according to claim 16, wherein the suspension automobile further comprises magnetic devices and connecting devices; the automobile and the combined plate are connected through the two or more connecting devices; the connecting devices are elastic or hydraulic or pneumatic structures, one end of each connecting device is connected with the lower plate, and the other end of each connecting plate is connected with the corresponding wheel so that the wheels can eliminate lift force without being affected when the automobile generates lift force.

20. The suspension automobile according to claim 16, wherein the suspension automobile further comprises magnetic devices the second fluid channel is provided with magnetic devices inside, wherein magnetic poles, facing each other, of the magnetic devices are opposite, and the magnetic devices are arranged in the second fluid channel between the automobile and the combined plate and used for generating a repulsive force.

21. The suspension automobile according to claim 16 wherein the suspension automobile further comprises a control mechanism located in the automobile and wings, wherein the wings are arranged on the upper surface of the automobile, flow disturbing surfaces are arranged on the upper surfaces of the wings, and the control mechanism changes the shapes of the wings through control.

* * * * *